Figure 1:
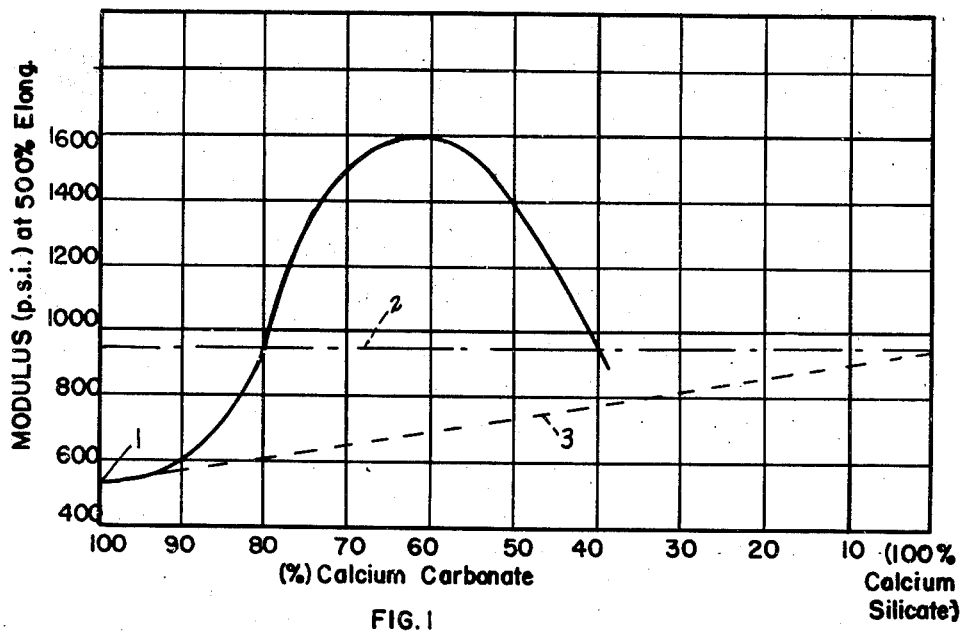

INVENTORS
Howard F. Roderick & Fritz M. Zorn
BY William R. Day
Attorney

Patented May 17, 1949

2,470,577

UNITED STATES PATENT OFFICE 2,470,577

COMPLEX CALCIUM CARBONATE-SILICATE PIGMENT PRODUCT AND METHOD OF MAKING SAME

Howard F. Roderick, Grosse Ile, and Fritz M. Zorn, Wyandotte, Mich., assignors to Wyandotte Chemicals Corporation, Wyandotte, Mich., a corporation of Michigan Application October 11, 1945, Serial No. 621,718

5 Claims. (Cl. 106—306)

The present invention relates to a dual or combined pigment product consisting of the carbonate and silicates of calcium. This product is especially adapted for use in compounding with rubber, in the forms of both natural rubber and synthetic chemical elastomers, whereby greatly improved elasticity is imparted to the compounded rubber material.

Heretofore calcium carbonate alone has been used as a rubber pigment, but the elastic properties or stiffness of the compounded rubber, whether of natural or synthetic derivation, have not been of sufficiently high values. The property of stiffness or resistance to extension of rubber is referred to by the term "modulus," and represents the amount of pull in pounds per square inch necessary to stretch a test piece to a specified elongation, usually 300% and 500% of its original length.

So also has a calicum silicate pigment, in which the molar ratio of $SiO_2$ to $CaO$ is above 2 to 1 and preferably on the order of 3.36 to 1 (see U. S. Patent No. 2,287,700), been employed as a rubber pigment wherein an improvement in the value of the modulus has been obtained. It would, therefore, appear obvious to a worker in this art, that a mixing of a calcium silicate pigment with a calcium carbonate pigment or the substitution of a calcium silicate pigment for some of the calcium carbonate pigment, would result in increasing the modulus as compared to that of the rubber compounded with calcium carbonate alone. However, it has been found that a mere admixture of a calcium silicate, such as that disclosed in the aforesaid U. S. Patent No. 2,287,700, results in no more an enhancement of the modulus values than would be normally expected from the relative proportions of the silicate and carbonate pigments present. In other words, where a calcium silicate and varying proportions of calcium carbonate are compounded with the rubber, the maximum modulus value obtainable is no greater than that for the rubber compounded with a pigment consisting entirely of the calcium silicate.

We have discovered, first, that where calcium carbonate and a calcium silicate are precipitated simultaneously from a common reaction solution, the modulus values of the rubber compounded with a co-precipitated product, are most extraordinarily and unexpectedly high, being nearly two and three times, respectively, the values obtainable by the use of a calcium silicate pigment alone and calcium carbonate pigment alone. Thus, it can be stated that the dual calcium carbonate-silicate pigment product of our invention displays an improvement in the properties of elasticity of the rubber with which it is compounded, which improvement is of a synthetic nature. Secondly, we have discovered that the ratio of the calcium carbonate present in the combined or dual pigment product, occurs within a critical range, namely 40 to 85% by weight of the total pigment composition.

And quite contrary to the teachings of the prior art, we have discovered that the molar ratio of the $SiO_2$ to the $CaO$ in the calcium silicate constituent of our dual product, must also be maintained in a critical range which is below 2 to 1, viz: in the range of 1.1–1.55 to 1. This particular molar ratio range of $SiO_2$ to $CaO$, being dependent on the molar ratio of the corresponding $SiO_2/Na_2O$ ratio in the soluble reactants from which they are derived, and which reactant radicals (Viz: $SiO_2$, $Na_2O$, and Ca) are initially employed to form the calcium silicate constituent of our product, is also of particular advantage in that there is no preliminary gel formation when the sodium silicate solution is mixed with a sodium carbonate solution. At higher $SiO_2/Na_2O$ ratios, e. g. above 2 to 1, admixture of the soluble $SiO_2$ radical containing solution with soluble $CO_3$ radical containing solution, even in the case of those of relatively weak concentration, results in the formation of a gel which renders subsequent steps in the process most difficult or incapable of performance.

Additional objectives and advantages of our invention shall become apparent as the following description proceeds.

To the accomplishment of these foregoing and related ends and to enable any person skilled in the art readily to understand and practice the invention, the following full and concise description and annexed drawing set forth the best mode in which we have contemplated applying the principle thereof.

Figure 2:
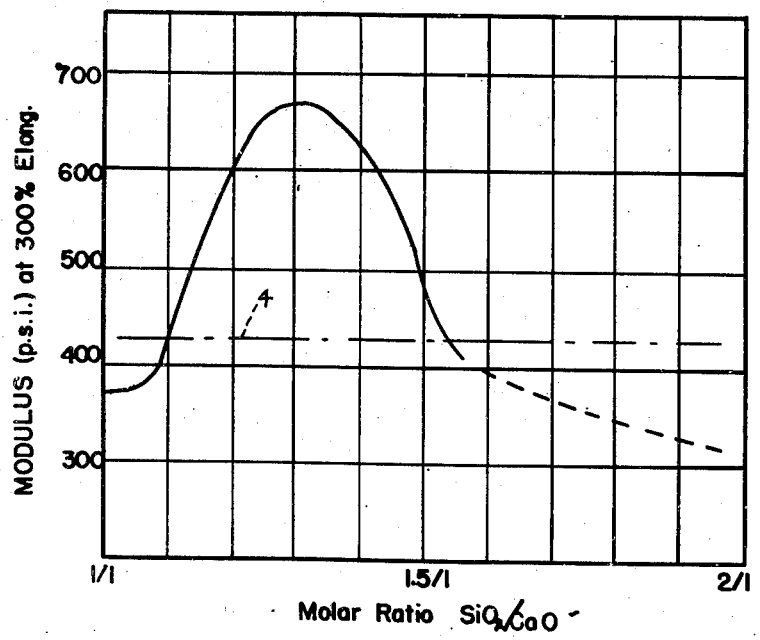

In said annexed drawing Fig. 1 is a curve illustrating the relationship between the modulus and the percentage proportions of calcium carbonate and calcium silicate present in the pigment product of our invention when compounded with a rubber, such as a synthetic chemical elastomer; and Fig. 2 is a curve illustrating the relationship between the modulus of a compounded rubber and the molar ratio of $SiO_2$ to $CaO$ in the pigment product of our invention incorporated in such rubber compound.

Generally outlined, the process of our invention involves the preparation of a solution of a water soluble alkali metal silicate, such as a sodium silicate having an $SiO_2$ to $Na_2O$ molar ratio of about 3 to 1, i. e. in the "water glass" range. This solution is then adjusted to a lower molar ratio of $SiO_2$ to $Na_2O$, by the addition of an alkaline metal oxide-containing compound such as caustic soda, such adjustment being in the range 1.1 to 1.55 mols of $SiO_2$ to one mol of $Na_2O$. This adjustment of $SiO_2$ to alkali metal oxide molar ratio, theoretically at least, determines the ultimate ratio of $SiO_2$ to $CaO$ in the calcium silicate portion of the precipitated product.

A second solution of a salt of carbonic acid such as sodium carbonate or bicarbonate, is next prepared. It will be readily understood by those skilled in the art that equivalent alkali metal salts such as those of potassium and ammonium may here be employed within the permissible spirit and scope of our invention. However, the sodium salts are preferred due to their greater commercial availability and economy. Liquor from the ammonia stills in the ammonia soda process, consisting of approximately 80% sodium carbonate and 20% sodium bicarbonate, and customarily known to those skilled in the art as "DO" liquor, constitutes an excellent source of raw material for supplying the carbonic acid salts for this stage of the process.

A third solution of a soluble calcium salt such as calcium chloride is next prepared. This solution should contain a sufficient amount of calcium ions, stoichiometrically, to react with the carbonate and silicate radicals present in the first two described solutions. Preferably a slight excess of the stoichiometric amount is used. The waste liquor from the ammonia stripping step in the ammonia soda process, consisting essentially of calcium chloride and having some slight excess of alkalinity, is a most suitable solution for a soluble calcium salt solution. Such liquor is customarily known as "DBO" liquor.

The silicate and the carbonate radical containing solutions may be preliminarily mixed with each other, or they may be simultaneously introduced directly to the calcium salt solution. The reacting solutions are subjected to an agitation, and the dual calcium carbonate-silicate product is precipitated. After washing, filtering, and drying of this product, it is then ready to be milled into a rubber compound, an exemplary formula for which is as follows:

| Ingredient | Grams |
| --- | --- |
| GR-S Polymer (Butadiene-Styrene Synthetic Elastomer) | 300.0 |
| "Santocure" (Mercaptobenzothiazole) | 3.0 |
| Diphenylguanidine | 4.5 |
| Cumar (MH 2½ grade) resin | 60.0 |
| Zinc Oxide | 15.0 |
| Stearic Acid | 15.0 |
| Pigment | ¹ 280.0 |
| Sulfur | 9.0 |

¹ Or 36% by vol. on basis of GR-S polymer.

Such rubber compound, after vulcanization, is then found to possess a modulus value which is greatly in excess of that heretofore obtained by the use of either a calcium carbonate or a calcium silicate pigment alone or in physical admixture. The results of compounded rubber specimens containing the dual calcium carbonate-silicate pigment of our invention, tested for modulus values according to standard test methods on the Scott tensile tester testing machine, are shown in Fig. 1. In this figure, the abscissa represents the proportion of calcium carbonate to the calcium silicate in the rubber pigment and the ordinate represents the values in pounds per square inch of the modulus at 500% elongation, the readings for same being taken at points of "optimum cure." This proportion of calcium silicate and carbonate in the product is determined by stoichiometric calculation of the amounts and proportion of $SiO_2$ to $CO_3$ radicals in the solution from which the precipitated product is formed.

From Fig. 1, it will be seen that the curve starting from the point 1 which represents the modulus for a rubber compounded with a calcium carbonate pigment alone, undergoes a slight rise as the calcium silicate content is increased. The line 2 represents the modulus (about 960 lbs. per sq. in.) for a similarly compound rubber containing a calcium silicate in which the molar ratio of $SiO_2$ to $CaO$ is 3.36 to 1. As the curve in Fig. 1 approaches 85% calcium carbonate, it crosses the line 2. This means that the modulus in rubber compounds containing the dual calcium carbonate-silicate pigment of our invention, wherein the ratio of calcium carbonate constituent is 85% and calcium silicate is 15%, is in pronounced excess of that obtainable by either the calcium carbonate or the calcium silicate pigment alone or in a mechanical admixture of the two. The line 3 represents the modulus readings that should be obtained by merely mathematically calculating the values based upon the relative proportions of the calcium carbonate and of calcium silicate present. Actual tests upon calcium carbonate and calcium silicate, separately made and either mechanically premixed or directly milled into the rubber compound, give confirming values for the line 3.

As the proportion of calcium carbonate decreases and approaches 50%, it will be seen that the curve in Fig. 1 is again directed downwardly and that at 40% calcium carbonate content the modulus value becomes substantially equal to that for a calcium silicate pigment alone. Thus, in the range of 40 to 85% calcium carbonate content of the dual or co-precipitated carbonate-silicate product of our invention, the modulus of the rubber compound containing it, displays the synergistic characteristic of being greater than the mathematical sum of both of the two ingredients. In the range of 50 to 75% $CaCO_3$ content, the modulus values are particularly high, being from 1400 to 1600 lbs. per sq. in. or a maximum of substantially three times the value (530 lbs. per sq. in.) for calcium carbonate alone.

If a gel is permitted to form in the practice of our process, prior to the calcium salt precipitation step, a wholly unsatisfactory pigment product results. We are unable to ascribe any scientific theory or principle to this particular phenomenon of our invention, but it is believed that the formation of the gel interferes with or retards the desired reaction of the calcium ions with the carbonate and silicate radicals initially in solution.

The molar ratio of $SiO_2$ to $CaO$ in the calcium silicate constituent of the product of our invention is also critical, as illustrated in Fig. 2. Here it will be seen that the modulus has enhanced values, or values above the line 4 which represents the modulus at a corresponding percentage of elongation for a rubber compound containing calcium silicate alone in which the $SiO_2/CaO$ ratio is 3.36 to 1. It will be seen that the molar ratio of $SiO_2$ to $CaO$ in the product of our invention occurs in the range 1.0-1.55 to 1. Outside of this range, the depreciation in modulus values becomes quite distinct. It will be understood by those skilled in the art that such molar ratio values of $SiO_2$ to $CaO$ in the final product are based upon the molar ratio of the corresponding reacting $SiO_2$ and $Na_2O$ radicals in the reactant solutions, i. e., the molar ratio of $SiO_2$ and $Na_2O$ as derived from the sodium silicate and sodium hydroxide present in the starting products. Inasmuch as the true scientific character of the calcium-silica system is not definitely known, and quantitative analysis of the exact nature of the chemical compounds in our product is extremely difficult, we have determined that the most convenient manner for defining the nature and scope of our invention is by reference to the proportions and compositions of the reacting ingredients.

*Example 1*

Sodium silicate of the water glass type, having the molar ratio of 3.35 mols of $SiO_2$ for each mol of $Na_2O$ present, and of a 42° Bé. concentration, was mixed in the amount of 500 grams with 185 grams of 50% sodium hydroxide. The molar ratio of the resultant solution was thereby adjusted to 1.3 mols of $SiO_2$ to each mol of $Na_2O$. A second solution of sodium carbonate-bicarbonate was then prepared which consisted of 3125 cc. of "DO" liquor from the ammonia soda process containing 174.8 grams per liter of $Na_2CO_3$ and 69.2 grams per liter of $NaHCO_3$.

A third solution of calcium chloride was then prepared, such solution consisting of 12,550 cc. of "DBO" liquor derived from the ammonia soda process and containing 112 grams per liter of calcium chloride for a total of 1400 grams of calcium chloride present in the solution. To this calcium chloride solution, there was added 184 cc. of 50% sodium hydroxide, which amounts to 1% by weight NaOH, on the basis of calcium chloride present, and thus imparting a slight excess of alkalinity to the "DBO" liquor or calcium chloride solution.

The first two solutions were then mixed together at a temperature of 97° F. and then added to the third calcium chloride solution which was at a temperature of 115° F. The mixed solutions were stirred and at the end of ten minutes time, during which precipitation of the calcium carbonate-silicate product occurred, a final slurry was obtained. This slurry was filtered, washed with water and dried over night at a temperature of 220° F. The dried product was reduced to a powdered form by treatment in a hammer mill and then milled into the rubber compound formula previously given. By calculation of the proportions of the reactants present, and on the basis of all the $CO_3$ radicals reacting with the calcium chloride to form calcium carbonate and the calcium ions replacing the sodium ions in the sodium silicate reactant solution, the resultant product contained 72% by weight calcium carbonate and 28% by weight calcium silicate having a molar ratio of 1.3 mols of $SiO_2$ per each mol of $CaO$. After vulcanization and testing of the so-compounded rubber, results were obtained as follows:

|  | P. s. i. |
|---|---|
| Modulus—500% elongation (at 20 min. optimum cure) | 1480 |
| Modulus—300% elongation (at 20 min. optimum cure) | 730 |
| Tensile strength | 1680 |

For purposes of comparison, a rubber pigment consisting entirely of a calcium silicate, viz: a commercially available product sold under the trade name "Silene" and noted as having the molar ratio of 3.36 mols of $SiO_2$ for each mol of $CaO$, was made up in a similar rubber compounding formula. The results were as follows:

|  | P. s. i. |
|---|---|
| Modulus—500% elongation (at 12 min. optimum cure) | 1240 |
| Modulus—300% elongation (at 12 min. optimum cure) | 500 |
| Tensile strength | 1670 |

For further comparison, a simple mechanical mixture of rubber pigment consisting of 72% by weight of calcium carbonate (a chemically precipitated $CaCO_3$ commercially available under the trade name "Witcarb R") and 28% by weight of the last mentioned calcium silicate pigment, on being milled into the rubber compounding formula and subjected to similar tests, gave the following results:

|  | P. s. i. |
|---|---|
| Modulus—500% elongation (at 12 min. optimum cure) | 750 |
| Modulus—300% elongation (at 12 min. optimum cure) | 280 |
| Tensile strength | 1610 |

Thus it will be seen, that the dual calcium carbonate-silicate pigment of our invention, and in which the proportion of calcium carbonate and silicate is the same as that of the two compounds merely mixed together and not simultaneously precipitated from a common solution, imparts a modulus value of nearly three times as great at 300% elongation, and nearly twice as great at 500% elongation; and with a slight increase in the tensile strength of the rubber compound.

*Example 2*

A combined calcium carbonate-silicate product was made by a procedure similar to that of Example 1, except that a smaller amount of sodium carbonate or "DO" liquor was employed, calculated to produce a final product containing 50% calcium carbonate and 50% calcium silicate. The test results of this product, when compounded with rubber in the exemplary compounding formula given, were as follows:

|  | P. s. i. |
|---|---|
| Modulus—500% elongation (at 30 min. optimum cure) | 1370 |
| Modulus—300% elongation (at 30 min. optimum cure) | 630 |
| Tensile strength | 1450 |

By way of comparison, a simple mixture of 50 parts by weight of calcium carbonate and 50 parts by weight of "Silene" calcium silicate (Ca 3.36 $SiO_2$), when compounded in the rubber formulation, displayed the following results:

|  | P. s. i. |
|---|---|
| Modulus—500% elongation (at 12 min. optimum cure) | 840 |
| Modulus—300% elongation (at 12 min. optimum cure) | 300 |
| Tensile strength | 1700 |

Following substantially the same procedure detailed in Example 1, except for a variation in the proportion of NaOH added to the water glass solution in order to correspondingly vary the $SiO_2/Na_2O$ ratio therein and the resultant $SiO_2/CaO$ ratio in the calcium silicate constituent of the product, and a variation in the amount of carbonate solution to in turn vary the calcium carbonate-silicate proportion of the product, the following results were obtained; which for conciseness and convenience are here set forth in tabular form:

|  | $SiO_2/CaO$ Molar Ratio | Per Cent By Weight $CaCO_3$ | 500% Modulus, p. s. i. | 300% Modulus, p. s. i. | Tensile Strength, p. s. i. |
|---|---|---|---|---|---|
| Example 3 | 1.51 to 1 | 75 | 1,050 | 430 | 1,660 |
| Example 4 | 1.3 to 1 | 60 | 1,570 | 760 | 1,660 |
| Example 5 | 1.1 to 1 | 76 | 1,100 | 440 | 1,665 |

The values for modulus in the above table were taken at a 12 minute optimum cure, except in the case of Example 4 where the optimum cure time was 30 minutes.

The modulus values given in Examples 1 to 5 will be found to coincide with points (within the margin of experimental error) on the curves of Figs. 1 and 2.

Other modes of applying the principle of our invention may be employed, changes being made as regards to the details described, provided the features stated in any of the following claims or the equivalent of such be employed.

We, therefore, particularly point out and distinctly claim as our invention:

1. A complex product which results from the process of simultaneously precipitating it from a common solution of carbonates and silicates of alkali metal salts by the addition of a calcium salt, the molar ratio of silica to the alkali metal oxide present in the silicate portion of said solution being in the range of 1.1–1.55 to 1, the resultant precipitated calcium carbonate portion of the product being present in an amount corresponding to 40–85% by weight.

2. The method of making a complex calcium carbonate-calcium silicate product which comprises preparing solutions of alkali metal salts of carbonic and silicic acids, the ratio of silica to alkali metal oxide in the latter being in the range of 1.1–1.55 to 1, the $CO_3$ radicals in such carbonic acid salt being present in an amount sufficient to correspond stoichiometrically to 40–85% by weight of calcium carbonate in the final product, admixing said solutions with a calcium salt solution, thereby precipitating an insoluble complex calcium carbonate and calcium silicate product therefrom, and then separating the precipitated product.

3. The method of making a complex calcium carbonate-calcium silicate product which comprises preparing solutions of sodium carbonate and of sodium silicate, the ratio of $SiO_2$ to $Na_2O$ in said sodium silicate solution being in the range of 1.1–1.55 to 1, the $CO_3$ radicals in said sodium carbonate solution being in an amount sufficient to correspond stoichiometrically to 40–85% by weight of calcium carbonate in the final product, admixing said solutions with a calcium chloride solution, thereby precipitating an insoluble complex calcium carbonate and calcium silicate product therefrom, and then separating the precipitated product.

4. The method of making a complex calcium carbonate-calcium silicate product which comprises, adding in water solution, an alkali metal hydroxide to an alkali metal silicate having a silica-alkali metal oxide molar ratio in the range of water glass to adjust the resultant molar ratio of silica to alkali metal oxide in such solution in the range of 1.1–1.55 to 1, adding an alkali metal salt of carbonic acid thereto in an amount sufficient to correspond stoichiometrically to 40–85% by weight of calcium carbonate in the final product, and then adding calcium chloride to precipitate simultaneously therefrom an insoluble complex calcium carbonate and calcium silicate product.

5. The method of making a complex calcium carbonate-calcium silicate product which comprises adding sodium hydroxide to a solution of water glass in such amount as to adjust the resultant molar ratio of $SiO_2$ to $Na_2O$ in the range of 1.1–1.55 to 1, simultaneously admixing with said adjusted water glass solution, solutions derived from the ammonia soda process and containing sodium carbonates and calcium chloride, respectively, thereby precipitating an insoluble complex calcium carbonate and calcium silicate product, and then separating the precipitated product therefrom, the amount of $CO_3$ radicals present in such carbonate reactant solution corresponding stoichiometrically to 40–85% by weight of calcium carbonate in the final product.

HOWARD F. RODERICK.
FRITZ M. ZORN.

REFERENCES CITED

The following references are of record in the file of this patent:

UNITED STATES PATENTS

| Number | Name | Date |
|---|---|---|
| 743,802 | Armbuster | Nov. 10, 1903 |
| 1,169,253 | Gardner | Jan. 25, 1916 |
| 1,574,380 | Endres | Feb. 23, 1926 |
| 1,991,367 | Beck et al. | Feb. 19, 1935 |
| 2,105,503 | Rafton | Jan. 18, 1938 |
| 2,211,510 | Meincke | Aug. 13, 1940 |
| 2,241,801 | Yohe et al. | May 13, 1941 |
| 2,259,481 | Mowlds | Oct. 21, 1941 |
| 2,259,482 | Mowlds | Oct. 21, 1941 |
| 2,263,606 | Balassa | Nov. 25, 1941 |
| 2,295,291 | Roderick | Sept. 8, 1942 |
| 2,314,188 | Allen | Mar. 16, 1943 |